United States
Shutt

4,113,387
Sep. 12, 1978

[54] DUAL MODE LASER OPTICS CONTROL FOR RING LASER GYRO

[75] Inventor: Sidney G. Shutt, Brea, Calif.

[73] Assignee: Rockwell International Corporation, El Segundo, Calif.

[21] Appl. No.: 768,511

[22] Filed: Feb. 14, 1977

[51] Int. Cl.² ........................... G01B 9/02; G01P 9/00
[52] U.S. Cl. .............................. 356/106 LR; 310/332; 331/94.5 S
[58] Field of Search ................................ 310/331, 332; 356/106 LR; 331/94.5 S

[56] References Cited

U.S. PATENT DOCUMENTS

| | | | |
|---|---|---|---|
| 3,166,683 | 1/1965 | Gootherts | 310/332 |
| 3,229,224 | 1/1966 | Waly et al. | 331/94.5 S |
| 3,252,110 | 5/1966 | Gustafson et al. | 331/94.5 S |
| 3,581,227 | 5/1971 | Podgorski | 356/106 LR |

*Primary Examiner*—Vincent P. McGraw
*Attorney, Agent, or Firm*—L. Lee Humphries; H. Fredrick Hamann; Rolf M. Pitts

[57] ABSTRACT

In a ring laser type gyro, laser optics adjustment means comprising a duo-mode bimorph device for separately controlling each of the optical length and alignment of the gyro laser optics.

10 Claims, 3 Drawing Figures

4,113,387

DUAL MODE LASER OPTICS CONTROL FOR RING LASER GYRO

BACKGROUND OF THE INVENTION

In the practical or successful operation of a ring laser type gyro, it is necessary to adjust the length of the laser optical path to achieve that optimum laser frequency associated with maximum laser gain. Also, adjustment of the alignment of the laser optics is required for stabilizing system losses.

In other words, an optimum path length adjustment is sought for maximum laser intensity, while maintenance of an optimum optical path alignment is sought in order to maintain optical cavity losses preferably at a minimum or at least at a constant value. Thus, by means of both adjustments, a peak laser output intensity is obtained and gyro bias stabilization is improved.

Prior methods for effecting such adjustments have relied upon movable mirrors for path length adjustment and stable geometry of mechanically positioned optical elements. However, obvious limits are imposed with regard to the mechanical tolerances and geometric stability achievable for a given design and choice of materials. Also, such limits are approached only at high unit costs and manufacturing expense. Further, the error sources associated with such limits are subject to change due to thermal expansion, material "creep" and the like.

Laser gyro path length control has been effected by control of a movable mirror interposed in the laser optical path. In such prior art arrangement, the path length is modulated to produce a modulated beam intensity which may be photoelectrically sensed and synchronously demodulated to provide an error path signal for closed loop control of the movable mirror. However, such control mode mechanization serves no other control mode function, such as optical path alignment.

BRIEF DESCRIPTION OF THE INVENTION

By means of the concept of my invention, the above-noted shortcomings of the prior art are overcome, and there is provided duo-mode control means for separately and concomitantly controlling the length and alignment of the gyro laser optical path.

In a preferred embodiment of the invention, there is provided a duo-mode bimorph device having a first and second input, each responsive to a mutually exclusive one of a first and second synchronously detected photodetector laser output of a ring-laser type gyro. A mirror situated within the laser optics of the gyro is mounted upon the bimorph device, whereby closed-loop control of the laser optics is effected.

In normal cooperation of the above-described arrangement, dual modulation or dithering of the laser optics is effected by the response of the bimorph to the two phase reference signals, while synchronous detection of the separately modulated components of the laser output provides closed-loop control of each of the two modes separately of the other. In this way, both peak intensity and gyro bias stabilization are obtained automatically.

Accordingly, it is an object of the invention to provide closed-loop means for improving the performance of a ring laser type gyro.

Another object of the invention is to apply a bimorph device in dual-mode control of the laser optics of a ring laser gyro.

Still a further object is to provide means for overcoming the limitations on geometrical stability in a ring laser gyro due to thermal coefficients of expansion, material creep, and the like.

These and other objects of the invention will become apparent from the following description, taken together with the accompanying drawings in which:

BRIEF DESCRIPTION OF THE DRAWINGS

In the figures like reference characters refer to like parts.

DESCRIPTION OF THE PREFERRED EMBODIMENT

Figure 1:
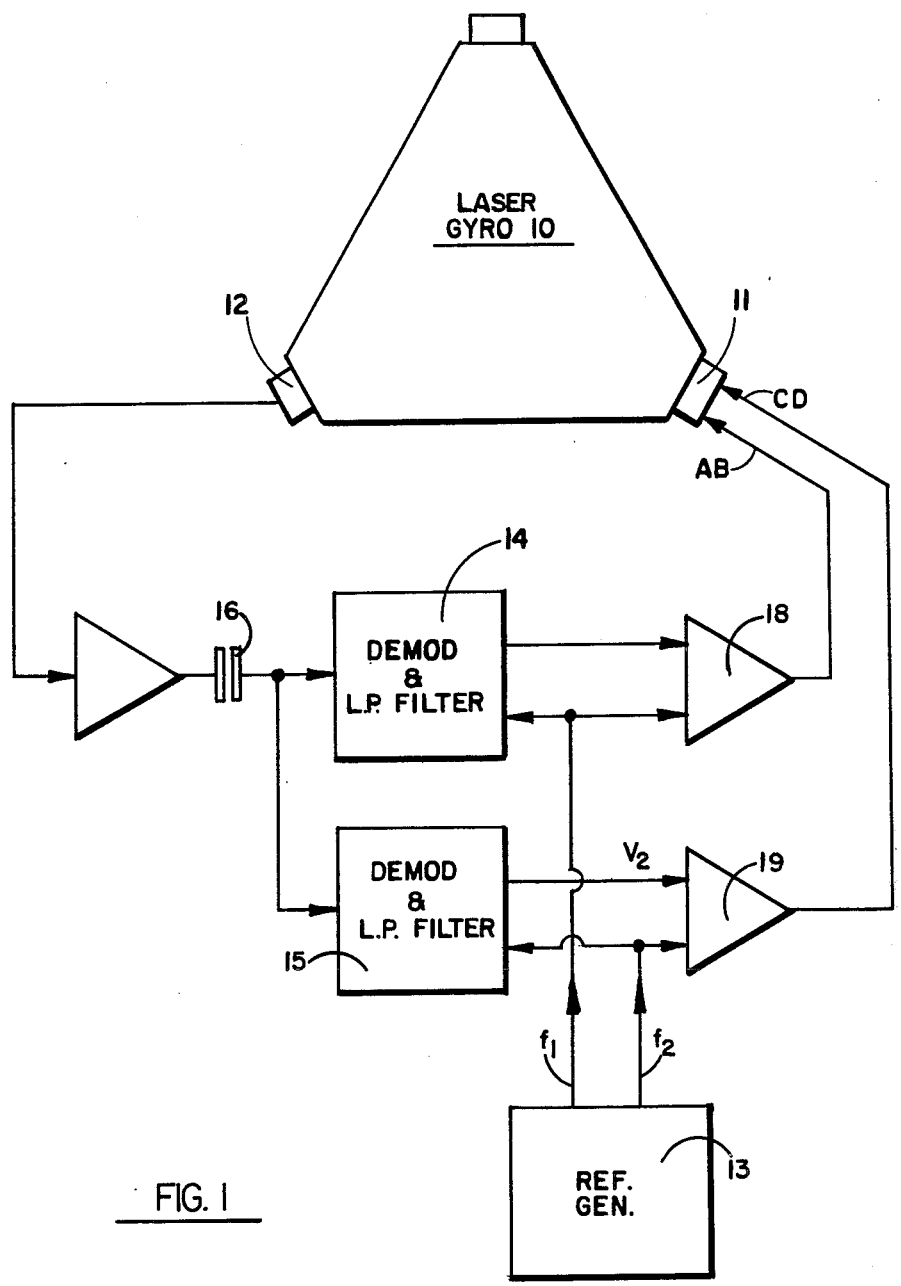
FIG. 1 is a block diagram of a system in which the concept of the invention may be advantageously employed.

Referring now to FIG. 1, there is illustrated in block diagram form a system embodying the concept of the invention. There is provided a ring laser gyro 10 having a bimorph element 11 mounted at one corner of the folded optic path of the laser cavity and a photodetector 12 mounted at another corner thereof. Bimorph element 11 is split (in a manner illustrated in FIG. 2) as to have dual control modes, each mode controllable by a mutually exclusive one of two terminal pairs AB and CD, represented by single control lines in FIG. 1.

Figure 2:
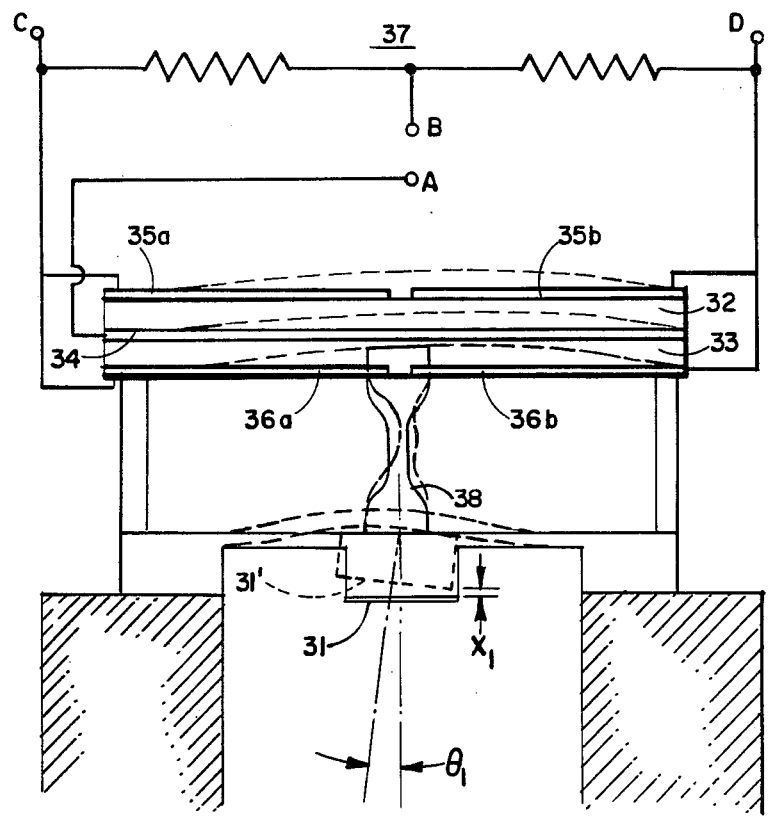
FIG. 2 is a schematic arrangement of the duo-mode bimorph device employed in the arrangement of FIG. 1.

As shown more fully in FIG. 2, the bimorph device 10 of FIG. 1 mounts a mirror 31 located within the laser optics of the laser gyro, as is well understood in the art. Such duo-mode bimorph device is comprised of two piezoelectric plates 32 and 33 sandwiching a center electrically-conductive plate 34 as to comprise a laminate, and two split electrically-conductive outer plates (35a, 35b and 36a, 36b) sandwiching the piezoelectric laminate, the halves of each split outer plate being spaced apart as to be electrically insulated from the other and in registry with a corresponding half of the other split plate and connected in electrical circuit therewith as to comprise a first control mode terminal pair (CD). In other words, half plate 35a is spaced apart from half plate 35b and half plate 36a is spaced apart from half plate 36b, half plates 35a and 36a being in registry and electrically interconnected to define terminal C, and half plates 35b and 36b being in registry and electrically interconnected to define terminal D.

There is also provided a center tapped voltage-splitting impedance 37 electrically connected across first control mode terminal pair (CD); the center electrically-conductive plate 34 and a center tap B of impedance 37 comprising a second control mode terminal pair (AB), the first and second control mode pairs comprising said first and second inputs of the bimorph device of FIG. 1.

The application of a control voltage across terminals C and D of the first terminal pair provides an assymmetrical voltage gradient across the piezoelectric laminate 32, 33 resulting in a rotational displacement at the laminate center, transmitted to the mirror 31 by post 38 (as illustrated in FIG. 2), thereby altering the optical alignment of the gyro laser optics.

The application of a control voltage across terminals A and B of the second terminal pair provides a symmetrical voltage gradient across laminate 32, 33, resulting in a translationally induced displacement (as illustrated in FIG. 2), thereby altering the optical path length of the gyro laser optics. The combined effect of the concomitant application of exemplary control voltages to both of control terminal pairs AB and CD is both a translational (vertical) and angular displacement, illustrated by the exemplary dotted phantom lines in FIG. 2 as $X_1$ (upward) and $\theta_1$ (clockwise). However, any combination of directions (up/down, clockwise/counterclockwise) may be realized, including alternating senses and amplitudes from the application of $a$–$c$ control signals to terminal pairs AB and CD in the arrangement of FIG. 1.

Referring again to FIG. 1, there is also provided a source 13 of two frequency-coded phase reference signals $f_1$ and $f_2$. A first and second synchronous detector 14 and 15 are commonly responsively coupled (by blocking capacitor 16) to the output of photodetector 12, each synchronous detector further having a reference input responsive to a mutually exclusive one of coded reference signals $f_1$ and $f_2$. A first differential signalling means 18 responsive to first reference signal $f_1$ and an output of first synchronous detector 14, provides a control signal output to first control mode terminal pair AB, while second differential signalling means 19 responsive to second reference signal $f_2$ and an output of second synchronous detector 15 provides a control signal output to second control mode terminal CD.

In normal operation of the above-described arrangement, the separately applied frequency coded signals $f_1$ and $f_2$ serve to separately modulate separate modes of duo-mode bimorph element 11, frequency $f_1$ being applied to terminal pair AB (via amplifier 18) to dither or modulate the path length or translational control mode, while the application of frequency $f_2$ to terminal pair CD (via amplifier 19) serves to dither or modulate the alignment or angular control mode. Such modulations of the laser cavity optics, as detected by element 12, are coupled to both of demodulators 14 and 15 by blocking capacitor 16. Separation of or discrimination between the two detected modulations is effected by phase modulators 14 and 15; demodulator 14 employing the reference signal $f_1$ as a phase reference to distinguish or phase-detect the translational-associated modulations at frequency $f_1$, while demodulator 15 employs the reference signal $f_2$ as a phase reference to distinguish or phase detect the angular displacement-associated modulations at frequency $f_2$. Low-pass filtering of the demodulator output attenuates signal effects due to heterodyning or mixing of the $f_1$ and $f_2$ frequency signals.

Each of differential amplifiers 18 and 19 serve as negative feedback devices for closed loop control of a respective one of the translational (or path length) and angular (or alignment) control modes. First amplifier 18 combines the phase-detected (bipolar analog) output of demodulator 14 with the $f_1$ dither reference output from signal generator 13 for control of the displacement mode of duo-mode bimorph element 11, so as to reduce the bimorph deviation from a preferred or optimum displacement operating condition $\overline{A}_{0\theta}$ (see FIG. 3). Similarly, second amplifier 19 combines the phase-detected output of demodulator 15 with the $f_2$ dither reference output from generator 13 for control of the alignment mode of bimorph element 11 so as to adjust the demodulator output in such a sense as to reduce the deviation from a preferred alignment operating condition $A_{x,0}$ in FIG. 3.

In a precision laser gyro, it is important to operate the optical frequency of the counter rotating beams nominally at the center of the intensity spectrum. If the beam frequency is changed relative to the frequency at peak intensity, the beam frequencies change with respect to each other and cause a gyro bias change. A change in path length will cause a change in beam frequency. My active servo control system is used to sense the peak intensity and control the path length to continuously maintain the beam frequency at a value corresponding to the frequency at maximum intensity.

In a precision laser gyro, it is also important to maintain constant loss in the beams to achieve good bias stability. A mirror alignment change with respect to the aperture will cause a loss change which results in a beam intensity change. My active servo control loop, being integral with the path length servo, is used to sense the peak intensity and control the mirror alignment about a first axis parallel to the opposite beam leg to continuously maintain beam alignment. Gyro bias change caused by mirror alignment change about a second axis normal to the plane of the beam is reduced to 30 times smaller than about the above-noted first axis. Therefore, active mirror alignment need be used only in one axis to achieve the required alignment stability.

The maximum beam intensity is held constant by a constant plasma excitation current, as is understood in the art, while the beam alignment control of the invention holds the beam alignment to an average intensity condition corresponding to such maximum intensity.

In a representative laser gyro design, bias sensitivity to path length change is typically 0.1 o/hr. per micro inch change in path length. A bias change of less than 0.1 o/hr. caused by path length change requires the path length to change less than 0.08 micro inches, which could be caused by a mirror face moving in a direction normal to its face by only 0.05 micro inches. The bias sensitivity to mirror alignment in its most critical axis (axis controlled) is typically 1.5 o/hr./sec. To hold a bias change to less than 0.1 o/hr. resulting from beam alignment would normally require mirror angles to be stable to better than 0.007 sec. If the optical cavity has its dimensions changed by creep or as a result of temperature changes, both the path length and beam alignment can change and such tolerances cannot normally be achieved (in the absence of my invention). Temperature transients are most apparent at warm-up conditions, creep more apparent between different start-ups. In either case of such environment-induced disturbance, my active path length and beam alignment control system detects a change in the relationship between the operating path length and alignment with respect to the maximum intensity, and applies an equal and opposite correction to the path length and beam alignment by compensatorily translating and rotating the diaphragm mirror to return the operating condition to that of maximum intensity.

Figure 3:
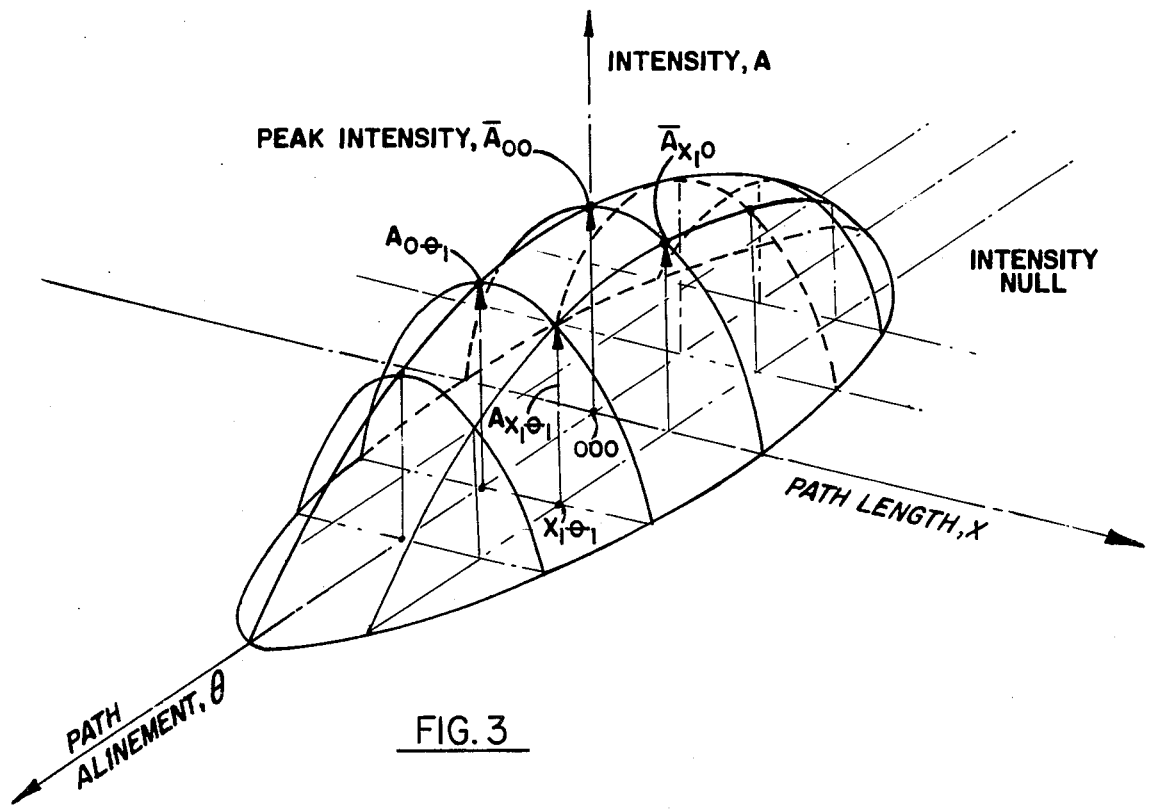
FIG. 3 is a representation of a response envelope of the laser intensity (A) of the laser gyro of FIG. 1 as a function of path length perturbation (X) and path alignment perturbation angle ($\theta$) from an optimum situation ($A_{00}$).

Accordingly, the control arrangement of FIG. 1 serves to control the amplitude A of the lasing condition of the gyro laser cavity to the optimum state represented in FIG. 3 as $A_{00}$.

Thus, it is to be appreciated that there has been described improved dual-mode control means for concomitant control of both the path length and alignment of the laser optics of a laser gyro.

Although the invention has been disclosed and illustrated in detail, it is to be clearly understood that the same is by way of illustration and example only and is not to be taken by way of limitation, the spirit and scope of this invention being limited only by the terms of the appended claims.

I claim:

1. In a laser gyro, laser optics adjustment means comprising
   a duo-mode bimorph device having a single common electrode plate sandwiched in an axially stacked dual bimorph array having a first and second coded input, each responsive to a mutually exclusive one of a first and second synchronously detected photodetector laser output of said laser gyro for laser amplitude and frequency control, respectively; and
   a mirror within the laser optics of said laser gyro being mounted upon said bimorph device, whereby closed-loop control of said laser optics is effected.

2. Apparatus for dual mode control of the laser cavity of a ring laser gyro, and comprising
   a duo-mode split bimorph device mounting a mirror interposed in the optical path of the laser optics of said gyro,
   a first and second synchronous detector commonly responsive to a photodetected laser output of said gyro, each said synchronous detector further having a reference input responsive to a mutually exclusive one of two coded phase reference signals,
   first differential signalling means responsive to a first one of said reference signals and to an output of said first synchronous detector for providing an output signal for control of a first mode of said bimorph device, and
   second differential signal means responsive to a second one of said reference signals and to an output of said second synchronous detector for providing an output signal for control of a second mode of said bimorph device.

3. The device of claim 2 in which there is further provided a frequency coded source of said two coded phase reference signals.

4. Apparatus for dual mode control of the laser cavity of a ring laser gyro, and comprising
   a duo-mode split bimorph device mounting a mirror interposed in the optical path of the laser optics of said gyro,
   a source of two frequency coded phase reference signals,
   a first and second synchronous detector commonly responsive to a photodetected laser output of said gyro, each said synchronous detector further having a reference input responsive to a mutually exclusive one of said coded phase reference signals,
   first differential signalling means responsive to a first one of said reference signals and to an output of said first synchronous detector for providing an output signal for control of a first mode of said bimorph device, and
   second differential signal means responsive to a second one of said reference signals and to an output of said second synchronous detector for providing an output signal for control of a second mode of said bimorph device.

5. Apparatus for separate control of the optical length and optical alignment of the laser cavity of a ring laser gyro, and comprising
   a duo-mode split bimorph device mounting a mirror interposed in the optical path of the laser optics of said gyro,
   a photodetector responsive to said gyro laser optics,
   a source of two frequency coded phase reference signals,
   a first and second synchronous detector commonly coupled to the photodetected laser output of said gyro, each said synchronous detector further having a reference input responsive to a mutually exclusive one of said coded phase reference signals,
   first differential signalling means responsive to a first one of said reference signals and to an output of said first synchronous detector for providing an output signal for control of a first mode of said bimorph device, and
   second differential signal means responsive to a second one of said reference signals and to an output of said second synchronous detector for providing an output signal for control of a second mode of said bimorph device.

6. The device of claim 5 in which said synchronous detectors are $a$–$c$ input coupled to said photodetected laser output.

7. Apparatus for dual mode control of the laser cavity of a ring laser gyro, and comprising
   a duo-mode split bimorph device mounting a mirror interposed in the optical path of the laser optics of said gyro, said device being comprised of
      two piezoelectric plates sandwiching a center electrically-conductive plate as to comprise a laminate;
      two split electrically-conductive outer plates sandwiching the piezoelectric laminate, the halves of each split outer plate being spaced apart as to be electrically insulated from the other and in registry with a corresponding half of the other split plate and connected in electrical circuit therewith as to comprise a first control mode terminal pair,
      a center tapped voltage splitting impedance electrically connected across said first control mode terminal pair;
      said center electrically conductive plate and said center tapped terminal comprising a second control mode terminal pair;
      said first and second control mode pairs comprising respective ones of said first and second inputs of said bimorph device;
   a photodetector responsive to the laser output of said gyro,
   a source of two frequency coded phase reference signals;
   a first and second synchronous detector commonly $a$–$c$ coupled to said photodetected laser output of said gyro, each said synchronous detector further having a reference input responsive to a mutually exclusive one of said coded phase reference signals;
   first differential signalling means responsive to a first one of said reference signals and to an output of said first synchronous detector for providing an output signal to said first control mode terminal pair for control of a first mode of said bimorph device; and second differential signal means responsive to a second one of said reference signals and to an output of said second synchronous detector for providing an output signal to said second control mode terminal pair for control of a second mode of said bimorph device, whereby the optical length and alignment of the laser cavity are separately controlled.

8. In a laser gyro, laser optics adjustment means comprising a duo-mode bimorph device having a first and second input, each responsive to a mutually exclusive one of a first and second synchronously detected photodetector laser output of said laser gyro; and a mirror within the laser optics of said laser gyro being mounted upon said bimorph device, whereby closed-loop control of said laser optics is effected;

said duo-mode bimorph device comprising two piezoelectric plates sandwiching a center electrically-conductive plate as to comprise a laminate;

two split electrically-conductive outer plates sandwiching the piezoelectric laminate, the halves of each split outer plate being spaced apart as to be electrically insulated from the other and in registry with a corresponding half of the other split plate and connected in electrical circuit therewith as to comprise a first control mode terminal pair;

a center tapped voltage splitting impedance electrically-connected across said first control mode terminal pair;

said center electrically-conductive plate and said center tapped terminal comprising a second control mode terminal pair; and said first and second control mode pairs comprising respective ones of said first and second inputs of said bimorph device.

9. In a laser gyro, laser optics adjustment means comprising a duo-mode bimorph device having a first and second input, each responsive to a mutually exclusive one of a first and second synchronously detected photodetector laser output of said laser gyro;

a mirror within the laser optics of said laser gyro being mounted upon said bimorph device, whereby closed-loop control of said laser optics is effected; and a source of two coded reference signals, each reference signal employed as a phase reference in the synchronous detection of a mutually exclusive one of said first and second synchronously detected photodetector laser outputs of said laser gyro, each of said first and second inputs of said bimorph device being differentially responsive to a respective one of synchronously detected photodetector laser outputs and to an associated one of said two coded reference signals.

10. In a laser gyro, laser optics adjustment means comprising a duo-mode bimorph device having a first and second input, each responsive to a mutually exclusive one of a first and second synchronously detected photodetector laser output of said laser gyro;

a mirror within the laser optics of said laser gyro being mounted upon said bimorph device, whereby closed-loop control of said laser optics is effected; and a source of a first and second coded reference signal, each employed as a respective reference in the synchronous detection of a respective one of said first and second synchronously detected photodetector laser outputs of said laser gyro, said first input of said bimorph device being differentially responsive to said first synchronously detected output and said first reference signal, and said second input of said bimorph device being differentially responsive to said second synchronously detected output and said second reference signal.

* * * * *